United States Patent [19]
Campbell et al.

[11] Patent Number: 5,927,454
[45] Date of Patent: Jul. 27, 1999

[54] INPUT SHAFT SLEEVE FOR A CLUTCH RELEASE ASSEMBLY

[75] Inventors: Steve C. Campbell, Ft. Wayne; Barry T. Adams, St. Joe; Leslie R. Graf, Fort Wayne, all of Ind.

[73] Assignee: Eaton Corporation, Cleveland, Ohio

[21] Appl. No.: 09/039,120

[22] Filed: Mar. 13, 1998

[51] Int. Cl.[6] .......................... B60K 41/24; F16D 67/02
[52] U.S. Cl. .......................................... 192/13 R; 192/98
[58] Field of Search .................................. 192/13 R, 98, 192/70.13, 110 B

[56] References Cited

U.S. PATENT DOCUMENTS

| | | | |
|---|---|---|---|
| 4,762,215 | 8/1988 | Flotow et al. | 192/107 |
| 4,919,243 | 4/1990 | Flotow | 192/18 R |
| 4,947,969 | 8/1990 | Tarlton, Sr. | 192/13 R |
| 5,031,739 | 7/1991 | Flotow et al. | 192/13 R |
| 5,435,425 | 7/1995 | Ijames | 192/13 R |

Primary Examiner—Rodney H. Bonck
Assistant Examiner—Tisha D. Waddell
Attorney, Agent, or Firm—Dykema Gossett PLLC

[57] ABSTRACT

A clutch release assembly for use in a motor vehicle includes a retainer sleeve, a retainer, a release bearing and an input shaft sleeve. The retainer has an axis of rotation, and has both a first end and a second end. The retainer is disposed on the first end of the retainer sleeve. The retainer is adapted to engage a radially inwardly directed end of one of a lever and a diaphragm spring finger. The release bearing is disposed on the second end of the retainer sleeve. The input shaft sleeve is disposed radially within the retainer sleeve and has a first end and a second end. The input shaft sleeve is radially sized to slidably fit both within the retainer sleeve and over an input shaft. The input shaft sleeve has a radially inwardly extending anti-rotation feature, and a radially outwardly extending travel limit. The input shaft sleeve has a smooth low friction surface disposed toward the retainer sleeve. The input shaft sleeve protects the retainer sleeve from the input shaft.

21 Claims, 5 Drawing Sheets

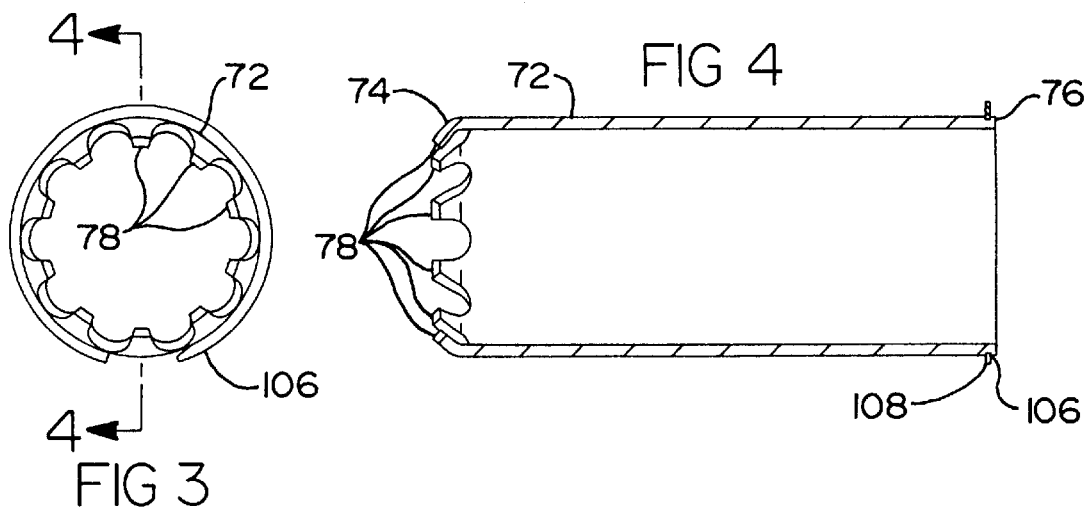
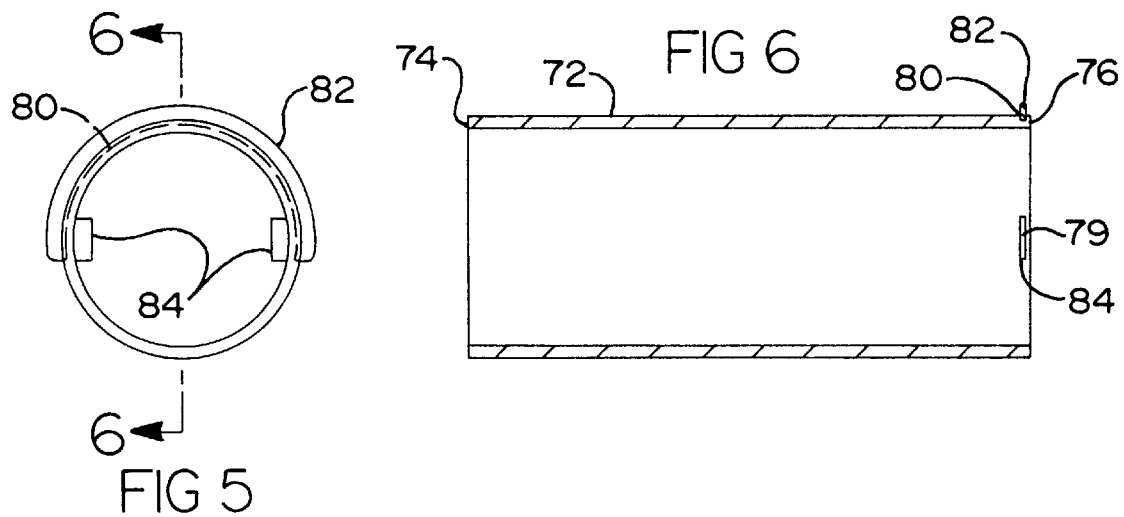
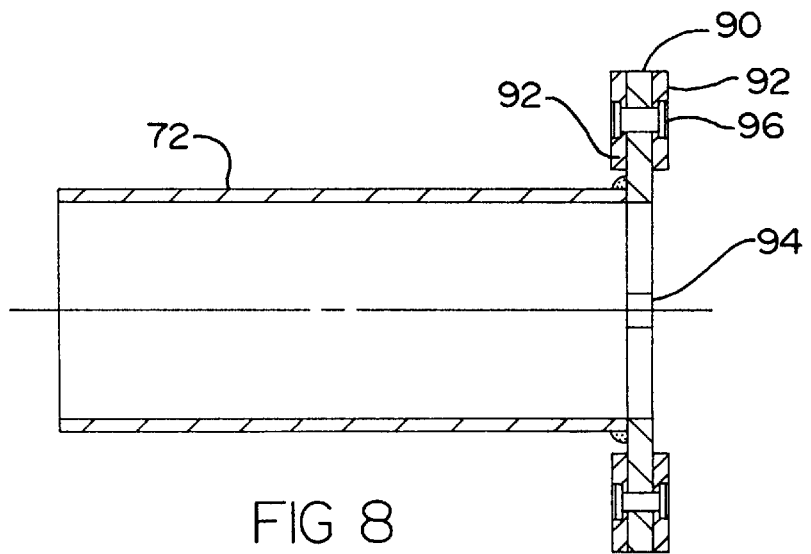

FIG 9
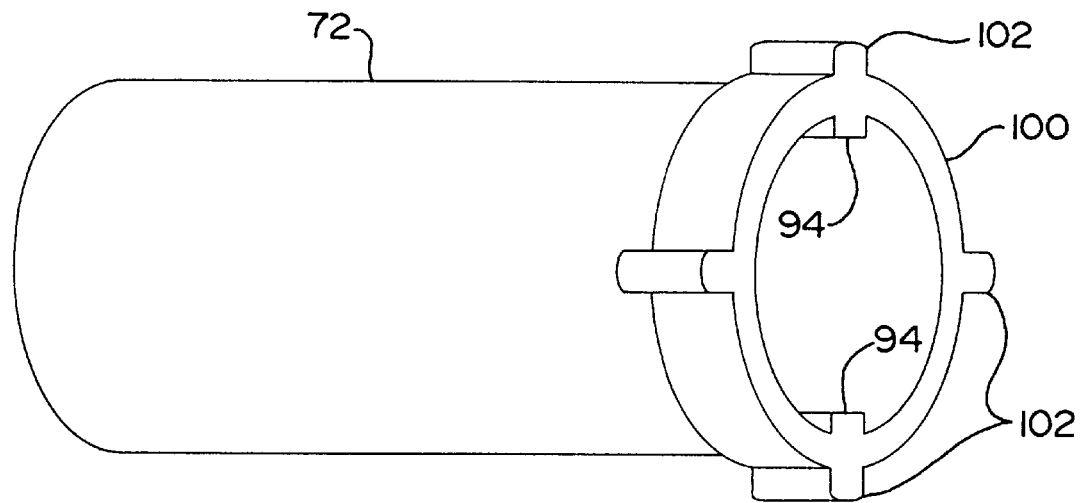
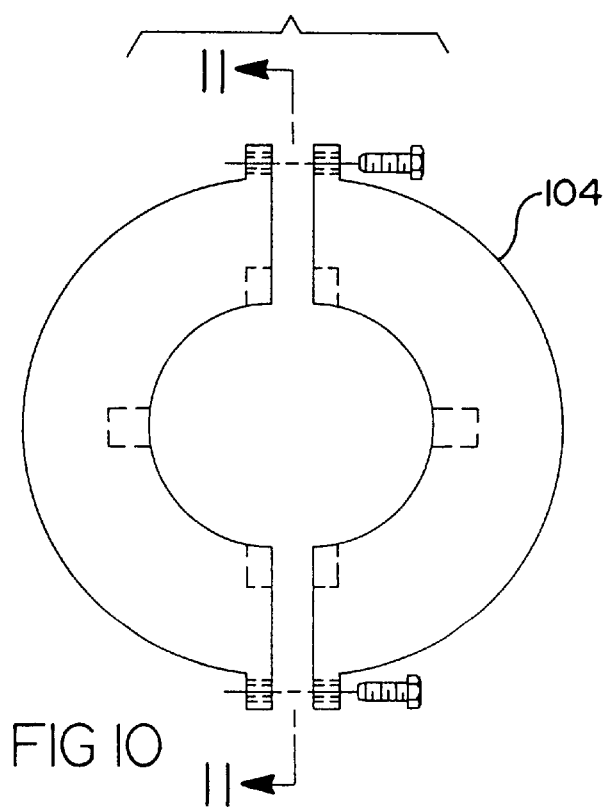
FIG 10
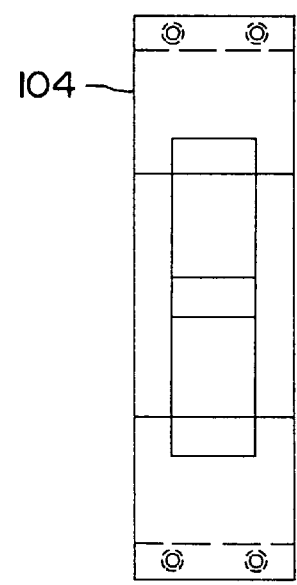
FIG 11

INPUT SHAFT SLEEVE FOR A CLUTCH RELEASE ASSEMBLY

FIELD OF THE INVENTION

This invention relates to clutches for manual transmissions, and particularly to pull clutches having a release assembly with an axially extending retainer sleeve.

BACKGROUND OF THE INVENTION

Pull type friction clutches for medium and heavy duty trucks commonly have a retainer sleeve disposed over a transmission input shaft. The sleeve connects a release bearing with a retainer. The release bearing has an outer portion engaged by the clutch release linkage. The retainer is engaged by clutch levers, or the tips of radially inwardly extending diaphragm spring fingers. The retainer, retainer sleeve and release bearing are all selectively displaced in an axial direction along the input shaft to engage and disengage the clutch.

The retainer, the retainer sleeve and an inner bearing race of the release bearing rotate as a unit with a pressure plate and a cover of the clutch. The outer race of the release bearing does not rotate relative to a transmission housing because it is engaged to a clutch yoke. The clutch yoke comprises part of the clutch actuation linkage. The clutch pressure plate and cover are rotatively fixed to an engine flywheel and rotate as a unit therewith.

A clutch driven disc is rotatably connected with the transmission input shaft for rotation therewith. When the clutch is engaged, the driven disc and the input shaft rotate at the same speed as the engine flywheel. When the clutch is disengaged, the driven disc and input shaft are uncoupled from those parts of the clutch which rotate with the engine, permitting relative rotation between the input shaft and the retainer sleeve. Differential speed between the retainer sleeve and the input shaft contributes to the wear of the retainer sleeve. Anti-friction bushings are commonly disposed in the retainer sleeve to help reduce the consequences of the engagement between the input shaft and the sleeve. However, grooves cut into the input shaft form edges which can damage the bushings. Also, customer expectations of increasingly longer periods of service free operation require further improvement of the retainer sleeve to input shaft interface.

Clutch brakes are used in heavy duty and medium duty trucks to slow a transmission input shaft, and therefore the gears within the transmission, to facilitate shifting of a non-synchronized manual transmission. A clutch brake is slidably disposed on the input shaft between the release bearing and the transmission housing. The clutch brake is engaged by using the clutch linkage to pull the release bearing back to the full extent of its travel, compressing the clutch brake between the release bearing and the transmission housing or a feature rotatably fixed to the housing. One type of clutch brake has its engagement surfaces rotatably fixed to the input shaft. This is an inexpensive configuration because a one piece brake can be employed. Friction elements fixed to a hub are used to provide the engagement surfaces. However, such brakes absorb a high level of energy wearing the friction element and require servicing at a higher than desired frequency. Another type of clutch brake is a torque limiting clutch brake. Torque limiting clutch brakes allow slippage to occur internally between a first portion rotatably fixed to the input shaft and a second portion axially engaged by the release bearing and the transmission housing. The slippage increases the life of the brake by reducing the rate at which the brake must absorb energy. However, because they comprise a number of components including springs, a hub portion and an outer shell that must be assembled, such torque limiting brakes are more expensive than a non-slipping brake. Additionally, to service known torque limiting clutch brakes, the transmission must be separated from the engine. This is a very time consuming and therefore expensive service operation.

SUMMARY OF THE INVENTION

The present invention discloses an input shaft sleeve radially disposed between the input shaft and the retainer sleeve which advantageously reduces wear of the retainer sleeve.

The present invention also provides an improved non-slipping clutch brake. The present invention also provides an improved clutch brake which is easily serviced in its installed position without requiring separation of the transmission from the engine.

A clutch release assembly for use in a motor vehicle includes a retainer sleeve, a retainer, a release bearing and an input shaft sleeve. The retainer has an axis of rotation, and has both a first end and a second end. The retainer is disposed on the first end of the retainer sleeve. The retainer is adapted to engage a radially inwardly directed end of one of a lever and a diaphragm spring finger. The release bearing is disposed on the second end of the retainer sleeve. The input shaft sleeve is disposed radially within the retainer sleeve and has a first end and a second end. The input shaft sleeve is radially sized to slidably fit both within the retainer sleeve and over an input shaft. The input shaft sleeve has a radially inwardly extending anti-rotation feature, and a radially outwardly extending travel limit. The input shaft sleeve has a smooth low friction surface disposed toward the retainer sleeve. The input shaft sleeve protects the retainer sleeve from the input shaft.

A clutch for a motor vehicle includes a cover, a pressure plate, a spring, and a clutch release assembly. The cover has an axis of rotation. The pressure plate is coupled to the cover for rotation therewith, and for axial movement a limited distance therefrom. The spring is disposed between the cover and the pressure plate and biases the pressure plate away from the cover. The clutch release assembly engages the spring. The clutch release assembly also includes a retainer sleeve, a retainer, a release bearing and an input shaft sleeve. The retainer sleeve is centered on the axis of rotation and has both a first end and a second end. The retainer is disposed on the first end of the retainer sleeve, and engages a radially inwardly directed end of one of a lever and a diaphragm spring finger. The release bearing is disposed on the second end of the retainer sleeve. The input shaft sleeve is disposed radially within the retainer sleeve. The input shaft sleeve has a first end and a second end. The input shaft sleeve is radially sized to slidably fit both within the retainer sleeve and over an input shaft. The input shaft sleeve has a radially inwardly extending anti-rotation feature and has a radially outwardly extending travel limit. The input shaft sleeve rotates with the input shaft, and provides a smooth low friction surface protecting the retainer sleeve.

A clutch for a motor vehicle includes a flywheel, a cover, a pressure plate, a driven disc, a spring, and a clutch release assembly. The flywheel has an axis of rotation. The cover is fixed to the flywheel. The pressure plate is coupled to the cover for rotation therewith, and for axial movement a limited distance therefrom. The driven disc is axially disposed between the flywheel and the pressure plate and has a splined hub for rotatably connecting to an input shaft. The spring is disposed between the cover and the pressure plate, and biases the pressure plate away from the cover. The clutch release assembly engages the spring. The clutch release assembly includes a retainer sleeve, a retainer, a release bearing and an input shaft sleeve. The retainer sleeve is centered on the axis of rotation and has a first end and a second end. The retainer is disposed on the first end of the retainer sleeve and is adapted to engage a radially inwardly directed end of one of a lever and a diaphragm spring finger. The release bearing is disposed on the second end of the retainer sleeve. The input shaft sleeve is disposed radially within the retainer sleeve and has both a first end and a second end. The input shaft sleeve is radially sized to slidably fit both within the retainer sleeve and over an input shaft. The input shaft sleeve has a radially inwardly extending anti-rotation feature and has a radially outwardly extending travel limit. The input shaft sleeve rotates with the input shaft and provides a smooth low friction surface protecting the retainer sleeve.

BRIEF DESCRIPTION OF THE DRAWINGS

FIG. 3 is an end view of an input shaft sleeve.

FIG. 4 is a sectional side view of the input shaft sleeve of FIG. 3 taken in the direction of arrows 4.

FIG. 5 is an end view of a first alternative embodiment of an input shaft sleeve.

FIG. 6 is a sectional side view of the input shaft sleeve of FIG. 5 taken in a direction of arrows 6.

FIG. 8 is a sectional side view of the assembly of FIG. 7 taken in the direction of arrows 8.

FIG. 9 is an angled view of an input shaft sleeve and clutch brake hub assembly.

FIG. 10 is an exploded end view of clutch brake friction material.

FIG. 11 is a side view of the friction material of FIG. 10 taken in the direction of arrows 11.

DESCRIPTION OF PREFERRED EMBODIMENTS

Figure 1:
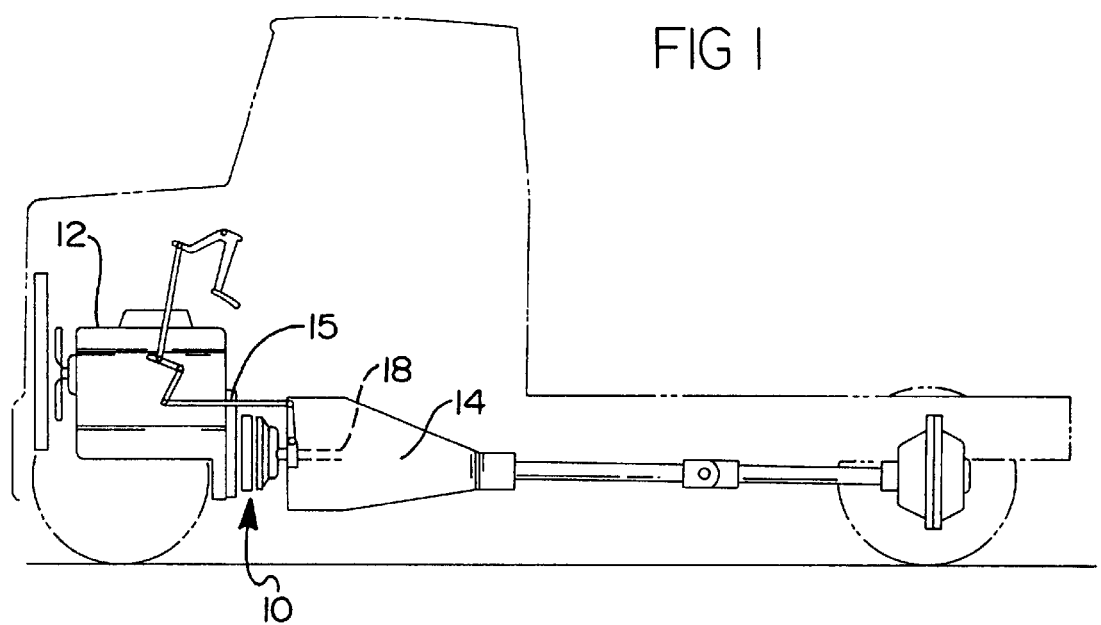
FIG. 1 is a side view of a drive train, including an engine, a transmission and an axle in their relative vehicle locations.

A frictional drive or clutch 10 is disposed between an engine 12 and a transmission 14. A clutch linkage 15 is used to selectively disengage and reengage clutch 10 by a vehicle operator.

A flywheel 16 is rotatably coupled to the engine's crank shaft for unitary rotation therewith. Transmission 14 includes an input shaft 18. A driven disc 20 is slidably disposed over input shaft 18 for unitary rotation therewith. Driven disc 20 is axially disposed between flywheel 16 and a pressure plate 22. Pressure plate 22 is rotatably connected to flywheel 16 through a cover 24. A spring force biasing pressure plate 22 toward flywheel 16 compresses driven disc 20 between pressure plate 22 and flywheel 16, causing input shaft 18 to rotate as a unit with flywheel 16 and pressure plate 22.

Clutch cover 24 is mounted directly to flywheel 16 and substantially encloses pressure plate 22. Cover 24 can be cast or stamped. A release assembly 26 is slidably disposed over input shaft 18. Pressure springs 28 provide the spring force biasing pressure plate 22 toward flywheel 16 and engaging driven disc 20. Pressure springs 28 are disposed between release assembly 26 and cover 24.

A plurality of levers 32, preferably six, are used to transfer the spring force from release assembly 26 to pressure plate 22. Each lever 32 has a radially inwardly disposed end or tip engaging release assembly 26, and each has an outer end engaging an adjusting mechanism 34. Each lever 32 also has a projection 36 contacting an annular shoulder 38 on a back side of pressure plate 22. An antirotation strap 42 rotatably connects pressure plate 22 with cover 24 while allowing relative axial motion of pressure plate 22 relative to cover 24.

A hub 44 of driven disc 20 has internal splines slidably disposed over external splines 45 of input shaft 18. A plate 46 having friction material 48 disposed on both sides thereof is rotatably connected to hub 44. Commonly, damping springs are disposed between hub 44 and plate 46.

Release assembly 26 includes a retainer 52 connected to a retainer sleeve 54. Retainer 52 has a plurality of spring engagement features and is fixed to retainer sleeve 54 at a first end 56 thereof. First end 56 has an expanded conical shape which keeps retainer 52 from slipping off first end 56 of sleeve 54. A second end 58 of sleeve 54 has a snap ring 60 disposed in a groove. A release bearing assembly 62 is mounted on second end 58 and retained thereon by snap ring 60. A cushioning spring 66 is axially positioned between a reaction washer 68 abutting retainer 52 and an inner race of release bearing assembly 62.

A pair of bushings 70 of low friction material such as polytetra fluoroethylene (PTFE) are fixed within the inner diameter of sleeve 54.

An input shaft sleeve 72 is radially disposed between input shaft 18 and sleeve 54. Sleeve 72 has an outer diameter surface fabricated to a controlled micro finish. The outer diameter surface is either surface coated or plated to further enhance its low friction characteristics. Sleeve 72 has a first end 74 and a second end 76. First end 74 has a plurality of radially inwardly directed spline engagement fingers 78 which are slidably disposed in the gaps between input shaft splines 45. Engagement between fingers 78 and splines 45 prevents sleeve 72 from rotating relative to input shaft 18, while allowing sleeve 72 to be axially displaced along input shaft 18. Fingers 78 are shown in more detail in FIG. 3 and FIG. 4. Although shaft 18, input sleeve 72 and retainer sleeve 54 are shown in line to line contact in FIG. 2, there may be appreciable radial gaps between the parts to facilitate relative rotation and axial movement.

Alternatively, as shown in FIG. 5 and FIG. 6, the second end 76 of sleeve 72 can have transverse apertures 79 therethrough and an aligned groove 80 provided in the outer periphery of sleeve 72 to accommodate a retaining clip 82 disposed therein. Clip 82 has a pair of oppositely disposed tips 84 extending radially inwardly through apertures 79 and into clutch brake slots 86. Tips 84 allow sleeve 72 to move axially along input shaft 18, while preventing relative rotation therebetween. Alternatively, second end 76 can be provided with a pair of radially inwardly extending teeth for non-rotatable engagement with clutch brake slots 86 by forming tabs on second end 76 and bending them radially inwardly.

Figure 7:
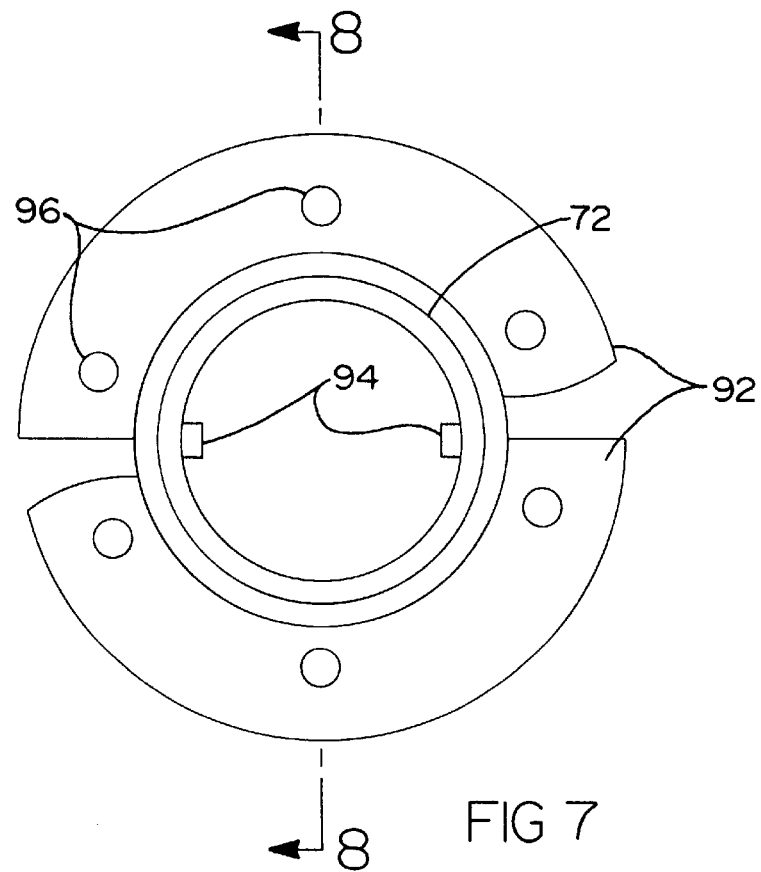
FIG. 7 is an end view of an input shaft sleeve and clutch brake assembly.
Figure 2:
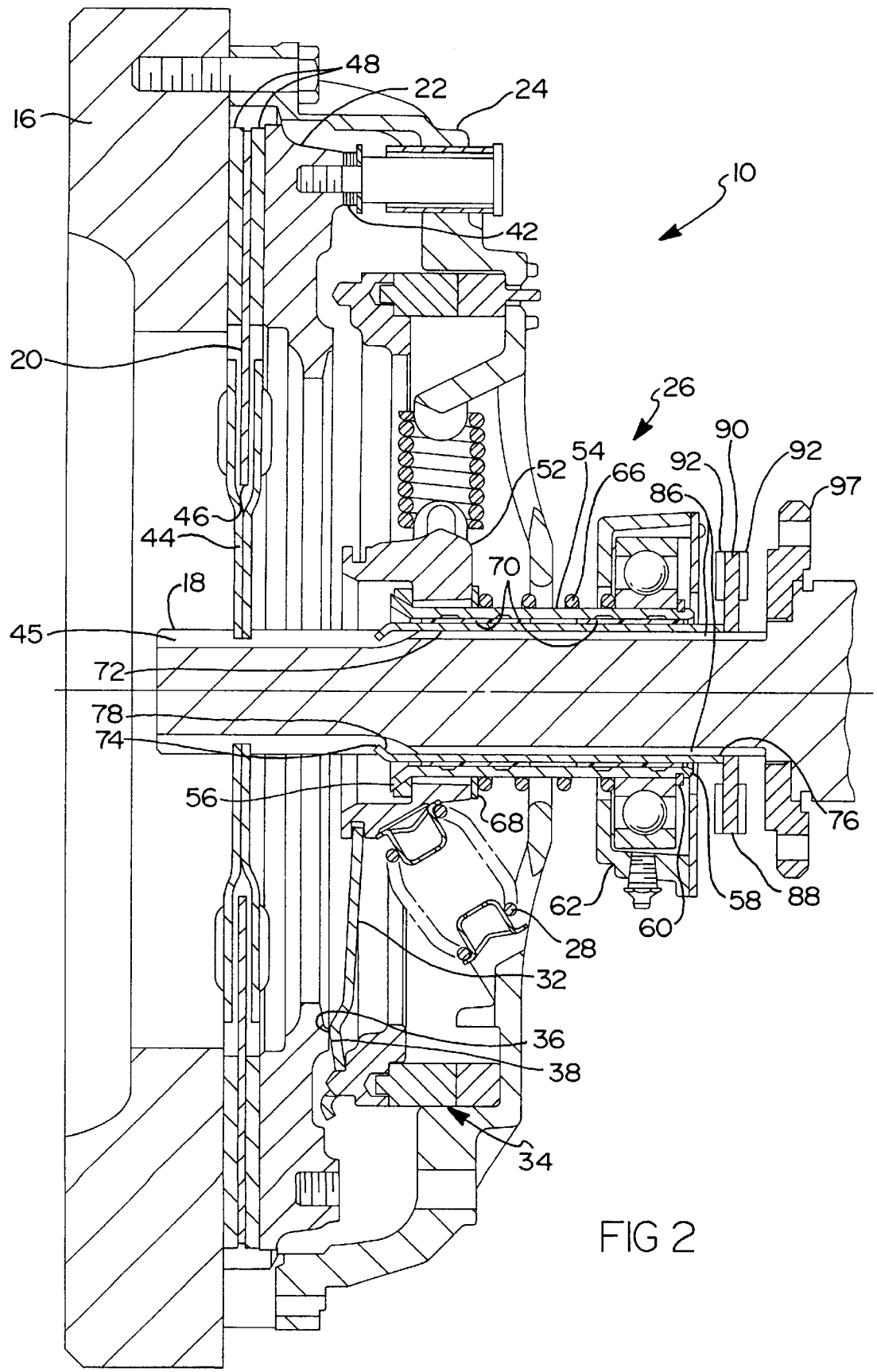
FIG. 2 is a sectional view of a clutch assembly.

As shown in FIG. 2, a clutch brake 88 is fixed to second end 76. Brake 88 includes a brake hub 90 welded to second end 76. Sleeve 72 is provided without fingers 78. Instead, brake hub 90 is provided with two engagement teeth 94 as shown in FIG. 7 and FIG. 8 for sliding engagement in slots 86. Friction material 92 is disposed on both sides of hub 90 and retained by rivets 96. The thickness of friction material 92 is selected sufficient to provide brake 88 with an extended period of maintenance free service. Brake 88 is axially disposed between a nonrotating surface of bearing 62 and an input shaft bearing shield 97 fixed to the housing of transmission 14.

An alternative clutch brake embodiment 88 is shown in FIGS. 9–11. A hub 100 has four outwardly radially extending projections 102. A shell shaped friction material 104 is formed in two halves. Friction material 104 is mounted on hub 100 by slipping two halves of the frictional material cover 104 over projections 102 and clamping the two halves together with screws as shown. This enables friction material 104 to be changed as a maintenance service without removing brake 88 from input shaft 18. This eliminates the need to separate engine 12 from transmission 14 to service the clutch brake.

Sleeve 72 need not necessarily be rigidly connected to the clutch brake. As shown in FIGS. 3 and 4, sleeve 72 can be provided with a snap ring groove 106 and a retainer ring 108 to limit the axial movement of sleeve 72 toward driven disc 20. A conventional torque limiting clutch brake would be axially disposed between sleeve 72 and transmission 14.

Figure 12:
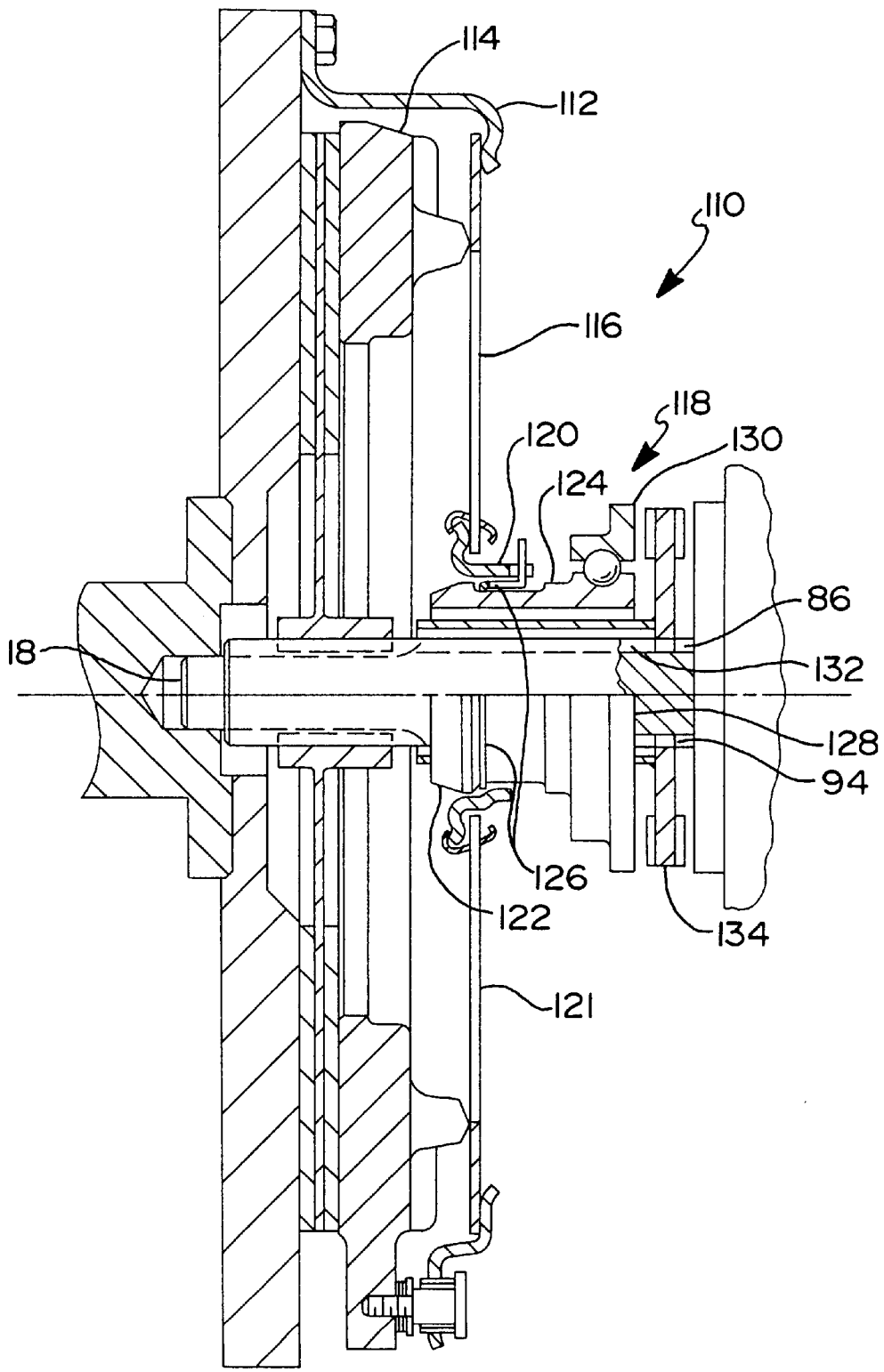
FIG. 12 is a sectional view of a diaphragm clutch.

The inventive release assembly can also be employed with a diaphragm spring type clutch 110 as shown in FIG. 12. A cover 112 is disposed over a pressure plate 114. A diaphragm spring 116 is functionally disposed between cover 112 and pressure plate 114 to bias pressure plate 114 away from cover 112. Release assembly 118 includes a retainer 120 which engages the radially inwardly disposed tips of diaphragm spring fingers 121. Retainer 120 is fixed to a first end 122 of retainer sleeve 124 by a snap ring 126. A second end 128 of sleeve 124 has a release bearing 130 formed integral therewith. An input shaft sleeve 132 is radially disposed between input shaft 18 and sleeve 124 as in the coil spring type clutch. A clutch brake 134 is welded to an end of sleeve 132.

The invention operates in the following manner. Clutch 10 is shown in an engaged condition in FIG. 2. In the engaged condition, driven disc 20 is clamped between pressure plate 22 and flywheel 16, causing input shaft 18 to rotate as a unit with flywheel 16. With clutch 10 in an engaged condition, there is essentially no relative rotation between retainer 52, retainer sleeve 54, input shaft sleeve 72, and input shaft 18. Clutch brake 88 rotates freely with input shaft sleeve 72. Fingers 78 keep input shaft sleeve 72 rotating as a unit with input shaft 18.

Before shifting transmission 14 from a first gear range to a second gear range, clutch 10 is moved to disengaged or released condition by the vehicle operator depressing a pedal connected to linkage 15 which axially displaces release bearing 62 toward input shaft bearing shield 97. Displacement of bearing 62 is achieved when sufficient pedal force is applied to overcome the force of springs 28. Retainer 52 moves with bearing 62, pivoting levers 32. As levers 32 pivot, projections 36 move away from flywheel 16, unloading pressure plate 22. When pressure plate 22 is unloaded, driven disc 20 and therefore input shaft 18 are able to rotate relative to flywheel 16. Within input shaft 18 no longer drivingly connected to flywheel 16 and transmission 14 still in gear, its rotational speed is controlled by a combination of the vehicle speed and the ratio of gears connecting the input shaft to the drive wheels. When the transmission is shifted to neutral, input shaft 18 is in a free spin condition and drops in speed as a function of friction within the transmission. When up-shifting, it is desired to slow the speed of the input shaft while the transmission is in the neutral condition to reduce or eliminate clash when shifting into the new transmission gear range. To slow the input shaft, release bearing 62 is stroked or displaced beyond the point at which clutch disengagement occurs, compressing the rotating clutch brake 88 between the non-rotating outer portion of release bearing 62 and the non-rotating bearing shield 97. As brake 88 is slowed, so is sleeve 72, input shaft 18 and driven disc 20.

While clutch 10 is in the released condition, there is relative rotation between input shaft sleeve 72 and retainer sleeve 54 for much of the time. However, there is little wear of bushings 70 within sleeve 54 due to the smooth, low friction surface provided to sleeve 72. When the operator estimates that input shaft 18 has slowed down sufficiently, transmission 14 is shifted into the new gear range, and the clutch pedal released by the operator to reengage clutch 10.

Fingers 78, in combination with the rigid attachment of sleeve 72 to brake 88, advantageously eliminates the need for grooves 86, even though they are still shown in FIG. 2. However, the embodiment of FIGS. 3–4, even though it employs fingers 78, would still need to include grooves 86 on input shaft 18. Because a clutch brake is not fixed to sleeve 72, the clutch brake would preferably employ teeth and grooves 86 therefore.

The embodiment of FIGS. 5–6 requires that grooves 86 be provided along input shaft 18 to accommodate tips 84. Tips 84 prevent the rotation of sleeve 72 relative to shaft 18. Clip 82 not only provides tips 84, but also serves as a retaining ring to prevent over-travel of sleeve 72.

As with the embodiment of FIG. 34, sleeve 72 of FIGS. 5–6 would be used in combination with a separate clutch brake.

The embodiment of FIGS. 7–8 operates in essentially the same manner as the embodiment of FIG. 2, except that teeth 94 are used to provide the rotative engagement of sleeve 72 and brake 90 with input shaft 18 instead of fingers 78.

The embodiment of FIGS. 9–11 is used and operates in much the same manner as the embodiment of FIGS. 7–8, except for the means of attaching the friction material to the hub. Friction material 104 is split into two halves which are screwed together. The screws can be accessed from a single side of the transmission, making it unnecessary to separate the transmission from the engine to replace friction material 104. Friction material 104 is prevented from spinning on hub 100 by projections 102 which engage corresponding notches in friction material 104.

The embodiment of FIG. 12 operates in essentially the same manner as the embodiment of FIG. 2. However, retainer 120 engages the radially inwardly disposed tips of fingers 121 instead of radially inwardly disposed tips of levers. Sleeve 132 and clutch brake 134 are welded together as in the embodiment of FIGS. 7–8. The outer race of release bearing 130 is connected to linkage 15 and therefore does not rotate. When release assembly 108 is drawn into engagement with brake 134, the speed of input shaft 18 is decreased.

The embodiments disclosed herein have been discussed for the purpose of familiarizing the reader with the novel aspects of the invention. Although preferred embodiments of the invention have been shown and disclosed, many changes, modifications and substitutions may be made by one having ordinary skill in the art without necessarily departing from the spirit and scope of the invention as described in the following claims.

We claim:

1. A clutch release assembly for use in a motor vehicle comprising:
   a retainer sleeve having an axis of rotation and having a first end and a second end;
   a retainer disposed on the first end of the retainer sleeve and the retainer adapted to engage a radially inwardly directed end of one of a lever and a diaphragm spring finger;
   a release bearing disposed on the second end of the retainer sleeve; and
   an input shaft sleeve disposed radially within the retainer sleeve and having a first end and a second end and being radially sized to slidably fit both within the retainer sleeve and over an input shaft and the input shaft sleeve having a radially inwardly extending anti-rotation feature and having a radially outwardly extending travel limit and the input shaft sleeve having a smooth low friction surface disposed toward the retainer sleeve wherein the input shaft sleeve protects the retainer sleeve from the input shaft.

2. A clutch release assembly as claimed in claim 1 wherein the travel limit is defined by a clutch brake fixed to an end of the retainer sleeve.

3. A clutch release assembly as claimed in claim 2 wherein the anti-rotation feature is defined by the clutch brake.

4. A clutch release assembly as claimed in claim 3 wherein the anti-rotation feature is defined by at least one tooth extending radially inwardly from the clutch brake.

5. A clutch release assembly as claimed in claim 2 wherein the clutch brake includes a hub portion fixed to the end of the retainer sleeve and has friction material clamped to the hub by removable fasteners accessible from an installed position.

6. A clutch release assembly as claimed in claim 1 wherein the input shaft sleeve has a pair of aligned apertures receiving radially inwardly extending tips of a clip disposed on an outer diameter side of the sleeve.

7. A clutch release assembly as claimed in claim 1 wherein the anti-rotation feature is defined by radially inwardly extending fingers formed on the first end of the input shaft sleeve.

8. A clutch for a motor vehicle comprising:
   a cover having an axis of rotation;
   a pressure plate coupled to the cover for rotation therewith and for axial movement a limited distance therefrom;
   a spring disposed between the cover and the pressure plate biasing the pressure plate away from the cover; and
   a clutch release assembly engaging the spring, the clutch release assembly including:
      a retainer sleeve centered on the axis of rotation and having a first end and a second end;
      a retainer disposed on the first end of the retainer sleeve and engaging a radially inwardly directed end of one of a lever and a diaphragm spring finger;
      a release bearing disposed on the second end of the retainer sleeve; and
      an input shaft sleeve disposed radially within the retainer sleeve and having a first end and a second end and being radially sized to slidably fit both within the retainer sleeve and over an input shaft and the input shaft sleeve having a radially inwardly extending anti-rotation feature and having a radially outwardly extending travel limit
   wherein the input shaft sleeve rotates with the input shaft and provides a smooth low friction surface protecting the retainer sleeve.

9. A clutch as claimed in claim 8 wherein the travel limit is defined by a clutch brake fixed to an end of the retainer sleeve.

10. A clutch as claimed in claim 9 wherein the anti-rotation feature is defined by the clutch brake.

11. A clutch as claimed in claim 10 wherein the anti-rotation feature is defined by at least one tooth extending radially inwardly from the clutch brake.

12. A clutch as claimed in claim 9 wherein the clutch brake includes a hub portion fixed to the end of the retainer sleeve and has friction material clamped to the hub by removable fasteners accessible from an installed position.

13. A clutch as claimed in claim 8 wherein the input shaft sleeve has a pair of aligned apertures receiving radially inwardly extending tips of a clip disposed on an outer diameter side of the sleeve.

14. A clutch as claimed in claim 8 wherein the anti-rotation feature is defined by radially inwardly extending fingers formed on the first end of the input shaft sleeve.

15. A clutch for a motor vehicle comprising:
   a flywheel having an axis of rotation;
   a cover fixed to the flywheel;
   a pressure plate coupled to the cover for rotation therewith and for axial movement a limited distance therefrom;
   a driven disc axially disposed between the flywheel and the pressure plate and having a splined hub for rotatably connecting to an input shaft;
   a spring disposed between the cover and the pressure plate biasing the pressure plate away from the cover; and
   a clutch release assembly engaging the spring, the clutch release assembly including:
      a retainer sleeve centered on the axis of rotation and having a first end and a second end;
      a retainer disposed on the first end of the retainer sleeve and engaging a radially inwardly directed end of one of a lever and a diaphragm spring finger;
      a release bearing disposed on the second end of the retainer sleeve; and
      an input shaft sleeve disposed radially within the retainer sleeve and having a first end and a second end and being radially sized to slidably fit both within the retainer sleeve and over an input shaft and the input shaft sleeve having a radially inwardly extending anti-rotation feature and having a radially outwardly extending travel limit
   wherein the input shaft sleeve rotates with the input shaft and provides a smooth low friction surface protecting the retainer sleeve.

16. A clutch as claimed in claim 15 wherein the travel limit is defined by a clutch brake fixed to an end of the retainer sleeve.

17. A clutch as claimed in claim 16 wherein the anti-rotation feature is defined by the clutch brake.

18. A clutch as claimed in claim 17 wherein the anti-rotation feature is defined by at least one tooth extending radially inwardly from the clutch brake.

19. A clutch as claimed in claim 16 wherein the clutch brake includes a hub portion fixed to the end of the retainer sleeve and has friction material clamped to the hub by removable fasteners accessible from an installed position.

20. A clutch as claimed in claim 15 wherein the input shaft sleeve has a pair of aligned apertures receiving radially inwardly extending tips of a clip disposed on an outer diameter side of the sleeve.

21. A clutch as claimed in claim 15 wherein the anti-rotation feature is defined by radially inwardly extending fingers formed on the first end of the input shaft sleeve.

* * * * *